US012678814B2

(12) United States Patent
Bunnell et al.

(10) Patent No.: US 12,678,814 B2
(45) Date of Patent: Jul. 14, 2026

(54) ELECTRONIC TRIGGER GRIP BATTERY OPERATED MODULAR SPRAYER

(71) Applicant: PACK1PRO, LLC, Bridgeport, MI (US)

(72) Inventors: John Bunnell, Essexville, MI (US); Mark Wolinski, Frankenmuth, MI (US)

(73) Assignee: PACK1PRO, LLC, Bridgeport, MI (US)

( * ) Notice: Subject to any disclaimer, the term of this patent is extended or adjusted under 35 U.S.C. 154(b) by 218 days.

(21) Appl. No.: 18/689,595

(22) PCT Filed: Sep. 7, 2022

(86) PCT No.: PCT/US2022/042680
§ 371 (c)(1),
(2) Date: Mar. 6, 2024

(87) PCT Pub. No.: WO2023/038917
PCT Pub. Date: Mar. 16, 2023

(65) Prior Publication Data

US 2024/0375138 A1 Nov. 14, 2024

Related U.S. Application Data

(60) Provisional application No. 63/260,938, filed on Sep. 7, 2021.

(51) Int. Cl.
*B05B 12/00* (2018.01)
*B05B 9/08* (2006.01)

(52) U.S. Cl.
CPC .......... *B05B 12/002* (2013.01); *B05B 9/0861* (2013.01); *B05B 9/0888* (2013.01)

(58) Field of Classification Search
CPC ... B05B 12/00; B05B 12/002; B05B 12/0022; B05B 12/0024; B05B 12/0026; B05B 9/0861; B05B 9/0888
See application file for complete search history.

(56) References Cited

U.S. PATENT DOCUMENTS

| | | | |
|---|---|---|---|
| D270,367 S | 8/1983 | Grime | |
| D291,113 S | 7/1987 | Bauer | |

(Continued)

FOREIGN PATENT DOCUMENTS

| | | | | |
|---|---|---|---|---|
| CN | 213078849 U | | 4/2021 | |
| CN | 109569937 B | * | 3/2025 | ............. B05B 12/02 |

OTHER PUBLICATIONS

Lovfash Electric Pressure Washer, Jul. 4, 2022, amazon.ca, Mar. 5, 2024, URL; https://www.amazon.ca/Electric-Pressure-Cordless-Portable-Operated/dp/B0B5R91CNS?th=1 (Year: 2022).

(Continued)

*Primary Examiner* — Darren W Gorman
(74) *Attorney, Agent, or Firm* — WARNER NORCROSS + JUDD LLP

(57) ABSTRACT

An improved pressurized sprayer is provided. The pressurized sprayer includes a support frame, a modular power center, and a spray wand. The support frame defines an internal reservoir, and the modular power center includes a pump, a controller, and a battery, the pump being fluidly coupled to the internal reservoir via a quick-release connector. The spray wand is fluidly coupled to the pump via a discharge hose and includes an inverted pistol grip having a push-button trigger and a thumbwheel potentiometer for controlling flow-rate or pressure. The readily accessible nature of these controls allows the operator to meet the needs of a variety of applications, with all controls at a natural forefinger and thumb rest point. The heavier elements of the spray wand remain below the forearm and hand of the operator. This configuration enhances the ergonomic feel of the spray wand by maintaining a natural upright trigger position.

10 Claims, 13 Drawing Sheets

(56) References Cited

U.S. PATENT DOCUMENTS

| | | | |
|---|---|---|---|
| D297,350 S | 8/1988 | Kille | |
| D304,068 S | 10/1989 | Herbst | |
| 5,050,804 A | 9/1991 | Svendsen et al. | |
| D320,430 S | 10/1991 | Renfrew | |
| D341,186 S | 11/1993 | Albers | |
| D353,321 S | 12/1994 | Steijns et al. | |
| 5,395,046 A | 3/1995 | Knobbe et al. | |
| D365,515 S | 12/1995 | Boykin | |
| 6,010,082 A | 1/2000 | Peterson | |
| 6,135,361 A | 10/2000 | Grassi | |
| D444,700 S | 7/2001 | Ebert | |
| D447,791 S | 9/2001 | Robidoux | |
| 6,467,705 B2 | 10/2002 | Robidoux | |
| D477,779 S | 7/2003 | Weihrauch | |
| D498,817 S | 11/2004 | Armaduzzi | |
| D501,536 S | 2/2005 | Armaduzzi | |
| 7,007,826 B2 | 3/2006 | Shapanus et al. | |
| D518,873 S | 4/2006 | Carpanese | |
| 7,032,841 B1 | 4/2006 | Swisher | |
| D555,767 S | 11/2007 | Carpanese | |
| D563,505 S | 3/2008 | Schmon et al. | |
| D570,448 S | 6/2008 | Wang | |
| D571,434 S | 6/2008 | Renner | |
| D573,691 S | 7/2008 | Busschaert et al. | |
| D582,513 S | 12/2008 | Zingoni | |
| D607,972 S | 1/2010 | Wang | |
| D630,708 S | 1/2011 | Blenkush et al. | |
| D632,586 S | 2/2011 | Bowers et al. | |
| D633,176 S | 2/2011 | Blenkush et al. | |
| D635,034 S | 3/2011 | Burgeson | |
| D636,272 S | 4/2011 | Pearson et al. | |
| 7,971,806 B2 | 7/2011 | Johnson et al. | |
| D649,221 S | 11/2011 | Sinders et al. | |
| D651,691 S | 1/2012 | Muetzel et al. | |
| D664,628 S | 7/2012 | Zhou et al. | |
| D692,095 S | 10/2013 | Hines et al. | |
| D692,531 S | 10/2013 | Li et al. | |
| D693,428 S | 11/2013 | Tullney et al. | |
| D704,300 S | 5/2014 | Li et al. | |
| D713,500 S | 9/2014 | Muhl et al. | |
| D715,153 S | 10/2014 | Hansen | |
| D719,638 S | 12/2014 | Pagliai | |
| D719,639 S | 12/2014 | Pagliai | |
| D720,040 S | 12/2014 | Robinson | |
| D720,041 S | 12/2014 | Robinson | |
| 8,939,387 B2 | 1/2015 | Fontaine | |
| D725,742 S | 3/2015 | Kennemer et al. | |
| D727,466 S | 4/2015 | Richter et al. | |
| D729,902 S | 5/2015 | Hollinger | |
| D734,429 S | 7/2015 | Wang | |
| D735,051 S | 7/2015 | Conway et al. | |
| 9,079,200 B2 | 7/2015 | Fornaro et al. | |
| D738,462 S | 9/2015 | Wang | |
| D740,393 S | 10/2015 | Gehrung | |
| D742,998 S | 11/2015 | Gooden et al. | |
| D744,351 S | 12/2015 | Hansen | |
| D753,265 S | 4/2016 | Burchard et al. | |
| D758,536 S | 6/2016 | Olson et al. | |
| D759,199 S | 6/2016 | Wrobel et al. | |
| 9,358,563 B2 | 6/2016 | Kennemer et al. | |
| D768,263 S | 10/2016 | Laber | |
| D772,380 S | 11/2016 | Fontaine | |
| D794,755 S | 8/2017 | Wang | |
| D794,756 S | 8/2017 | Wang | |
| D796,004 S | 8/2017 | Yang et al. | |
| 9,744,548 B2 | 8/2017 | Gopalarao et al. | |
| D798,419 S | 9/2017 | Gehrung et al. | |
| D812,719 S | 3/2018 | Kosaka | |
| D814,610 S | 4/2018 | Dawson et al. | |
| D816,801 S | 5/2018 | Ghorbani | |
| D820,389 S | 6/2018 | Gehrung et al. | |
| D821,545 S | 6/2018 | Gehrung | |
| 10,112,204 B2 | 10/2018 | Schrum et al. | |
| D834,144 S | 11/2018 | Mangold | |
| D834,944 S | 12/2018 | Holbrook et al. | |
| D835,235 S | 12/2018 | Gehrung et al. | |
| D839,386 S | 1/2019 | Ghorabni | |
| D844,106 S | 3/2019 | Dawson et al. | |
| D846,401 S | 4/2019 | Turner et al. | |
| D848,849 S | 5/2019 | Sim | |
| D854,123 S | 7/2019 | Becker et al. | |
| D857,162 S | 8/2019 | Dawson et al. | |
| D857,312 S | 8/2019 | Chavana, Jr. et al. | |
| D858,698 S | 9/2019 | Arino et al. | |
| D861,130 S | 9/2019 | Carls et al. | |
| 10,532,370 B2 | 1/2020 | Schrum et al. | |
| 10,639,657 B2 | 5/2020 | Fontaine et al. | |
| 10,766,046 B2 | 9/2020 | Fontaine et al. | |
| 10,864,538 B2 | 12/2020 | Allis et al. | |
| 10,994,294 B2 | 5/2021 | Fontaine et al. | |
| D1,043,915 S | 9/2024 | Bunnell et al. | |
| 2010/0006674 A1* | 1/2010 | Stenborg | B05B 12/002 239/528 |
| 2013/0008536 A1* | 1/2013 | Wrobel | E04F 21/12 137/565.01 |
| 2018/0154386 A1* | 6/2018 | Zhang | B05B 12/002 |
| 2019/0030554 A1* | 1/2019 | Mantes | B05B 9/0861 |
| 2021/0154691 A1 | 5/2021 | Schroeder et al. | |
| 2022/0088626 A1* | 3/2022 | Stoddard | A61L 2/035 |
| 2022/0134369 A1* | 5/2022 | Gustafson | B05B 9/0861 239/11 |
| 2024/0375138 A1 | 11/2024 | Bunnell et al. | |

OTHER PUBLICATIONS

Avhrit Cordless Pressure Washer, Jul. 4, 2022, amazon.ca, Mar. 5, 2024, URL: https://www.amazon.ca/dp/B0C4B13K1H/ (Year: 2022).

Craftsman Battery Powered Sprayer Wand, Oct. 14, 2020, amazon.com, Jun. 28, 2024, URL; https://www.amazon.com.au/Craftsman-190640-Battery-Powered-CMXCAFG190640/dp/B08kh81W9Q?th=1 (Year: 2020).

International Search Report and Written Opinion of the International Searching Authority for application No. PCT/US2022/042680, mailed Jan. 25, 2023 (16 pages).

* cited by examiner

ELECTRONIC TRIGGER GRIP BATTERY OPERATED MODULAR SPRAYER

CROSS-REFERENCE TO RELATED APPLICATIONS

This application claims the benefit of U.S. Provisional Application 63/260,938, filed Sep. 7, 2021, the disclosure of which is incorporated by reference in its entirety.

FIELD OF THE INVENTION

The present invention relates to pressurized sprayers which can be hand-carried or worn by an operator.

BACKGROUND OF THE INVENTION

Pressurized sprayers have been known for many years. Early pressurized sprayers included hand pumps and were typically used in forest or wood fires because they were portable. Modern pressurized sprayers retain the portability of earlier designs and are generally more compact. Modern pressurized sprayers are typically battery powered and include a fluid reservoir, an internal pump, and a spray wand. Additional components can include a rigid support frame and shoulder straps for supporting the pressurized sprayer on the operator's back.

An example pressurized sprayer is disclosed in U.S. Pat. No. 7,007,826 to Shapanus et al. This pressurized sprayer operates by a pull trigger, and a pump forces pressurized liquid through tubing. U.S. Pat. No. 10,112,204 to Schrum et al also discloses a portable pressurized sprayer. An electric pump module directs gas through a check valve into a connector to increase the gas pressure in the tank and force the liquid in the tank to flow through the feed line and out a spray nozzle. U.S. Pat. No. 10,532,370 to Schrum et al also discloses a portable pressurized sprayer in which a check valve in the connector increases the gas pressure in the liquid tank.

U.S. Pat. No. 10,639,657 to Fontaine et al and U.S. Pat. No. 10,766,046 to Fontaine et al disclose a mix-on-demand backpack sprayer in which a mixing manifold is used. U.S. Pat. No. 8,939,387 to Fontaine discloses a mechanical spray gun, and U.S. Pat. No. 9,744,548 to Gopalarao discloses a telescoping wand assembly. Other known pressurized sprayers are disclosed in U.S. Pat. No. 7,032,841 to Swisher, which discloses a hand-held battery operated sprayer, and U.S. Pat. No. 6,135,361 to Grassi, which discloses a wheeled cart, a wand, and an electric trigger.

Despite the existence of the foregoing, there remains a continued need for an improved pressurized sprayer having advantages over these and other systems. In particular, there remains a continued need for a pressurized sprayer having an ergonomic spray wand and a portable support frame having modular components.

SUMMARY OF THE INVENTION

An improved pressurized sprayer is provided. The pressurized sprayer includes a support frame, a modular power center, and a spray wand. The support frame defines an internal reservoir, and the modular power center includes a battery, a controller, and a pump, the pump being fluidly coupled to the internal reservoir via a quick-release connector. The spray wand is fluidly coupled to the pump via a discharge hose and includes an inverted pistol grip having a push-button trigger and a thumbwheel potentiometer for controlling flow-rate or pressure. The readily accessible nature of these controls allows the operator to meet the needs of a variety of applications, with all controls at a natural forefinger and thumb rest point. The heavier elements of the spray wand remain below the forearm and hand of the operator. This configuration enhances the ergonomic feel of the spray wand by maintaining a natural upright trigger position.

In one embodiment, the spray wand includes a trigger grip assembly, a spray tube, and a spray nozzle. The trigger grip assembly includes an outer housing comprising two mirror image halves, forming an ergonomic handle and base. The handle is angled forward relative to a lengthwise axis of the base, being rigidly connected to the base. The spray tube is joined to the output end of the base via a threaded fitting, and the discharge hose is joined to the input end of the base via a barbed fitting that is recessed within the trigger grip assembly.

In another embodiment, the modular power center includes a diaphragm pump, a fully variable pulse-width-modulated controller for driving the diaphragm pump, at least one rechargeable battery, a waterproof charging connector port, a waterproof push-button LED switch, and a wand cup for storing the spray wand. The controller provides a pulse-width-modulated output that is based on the position of the thumbwheel potentiometer. The modular power center can be interchangeably used with a variety of support frames or other accessories, and is removably secured to the corresponding support frame via a magnetic latching connection.

In use, the operator can seat and latch the modular power center in a receptacle opening in the desired support frame. The operator then connects the modular power center to the internal reservoir via a quick-release hose connector, and the operator connects the discharge hose (coupled to the spray wand) to the output port of the modular power center. The operator rotates the spray nozzle to select a desired spray pattern, and the operator controls the flow-rate using the thumbwheel potentiometer. Actuation of the electronic push-button trigger starts and stops the flow of pressurized fluid from the spray nozzle at the selected flow-rate and pattern.

These and other features and advantages of the present invention will become apparent from the following description of the invention, when viewed in accordance with the accompanying drawings and appended claims.

Before embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENT

Referring to FIGS. 1-13, an exemplary pressurized sprayer embodying the present invention is illustrated and generally designated 10. The pressurized sprayer 10 can be carried and/or worn by an operator, and the pressurized sprayer 10 can discharge a wide variety of fluids, for example water, cleaning fluids, pesticides (including insecticides and herbicides), and other fluids. The pressurized sprayer 10 is electrically powered using a modular power center 12 and can discharge fluids via an ergonomic trigger grip assembly 14 at a range of pressure settings and in a variety of spray patterns, depending on the intended application.

Figure 1:
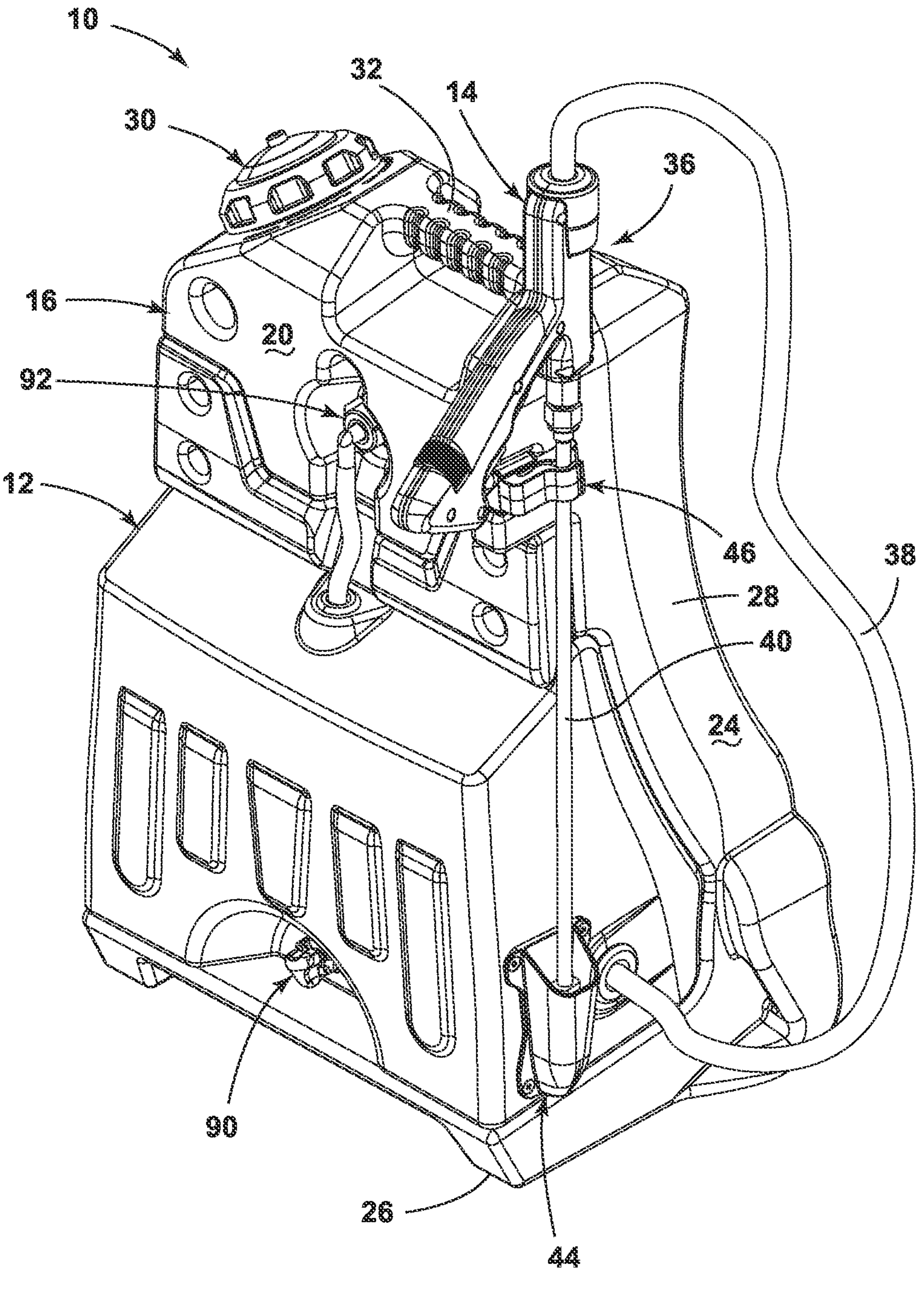
FIG. 1 illustrates a pressurized sprayer according to one embodiment.
Figure 2:
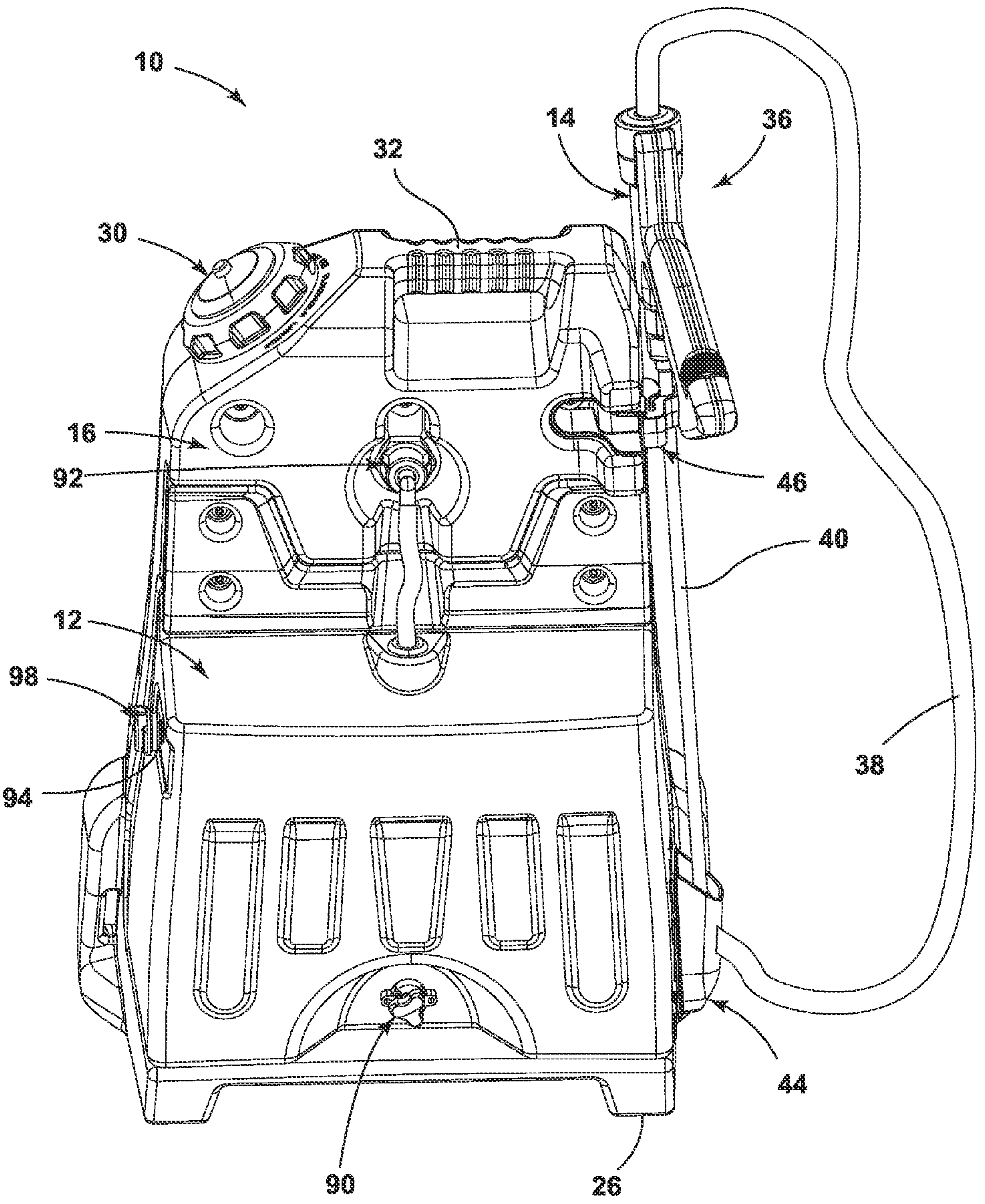
FIG. 2 is a back-facing view of the pressurized sprayer of FIG. 1.
Figure 3:
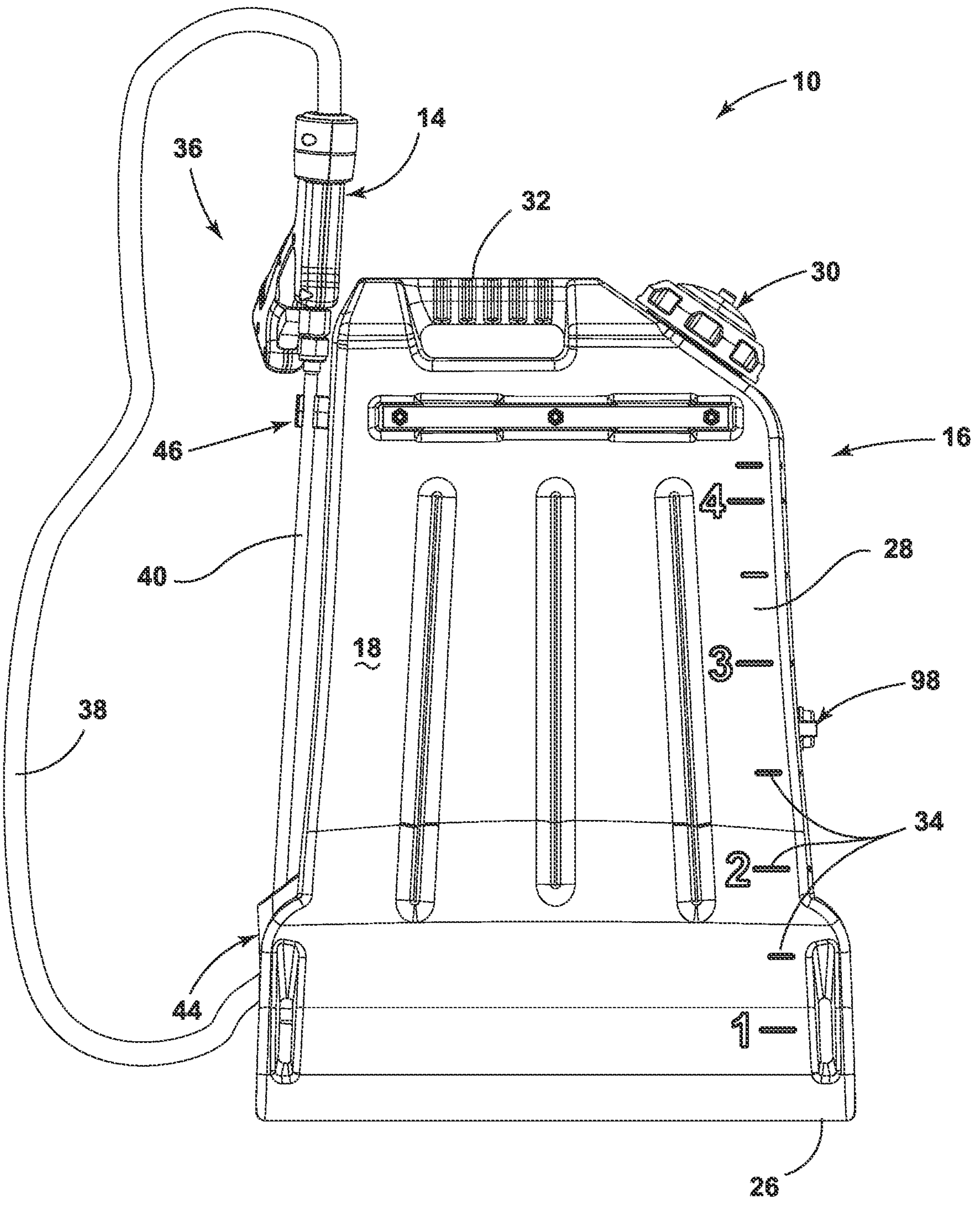
FIG. 3 is a front-facing view of the pressurized sprayer of FIG. 1.
Figure 4:
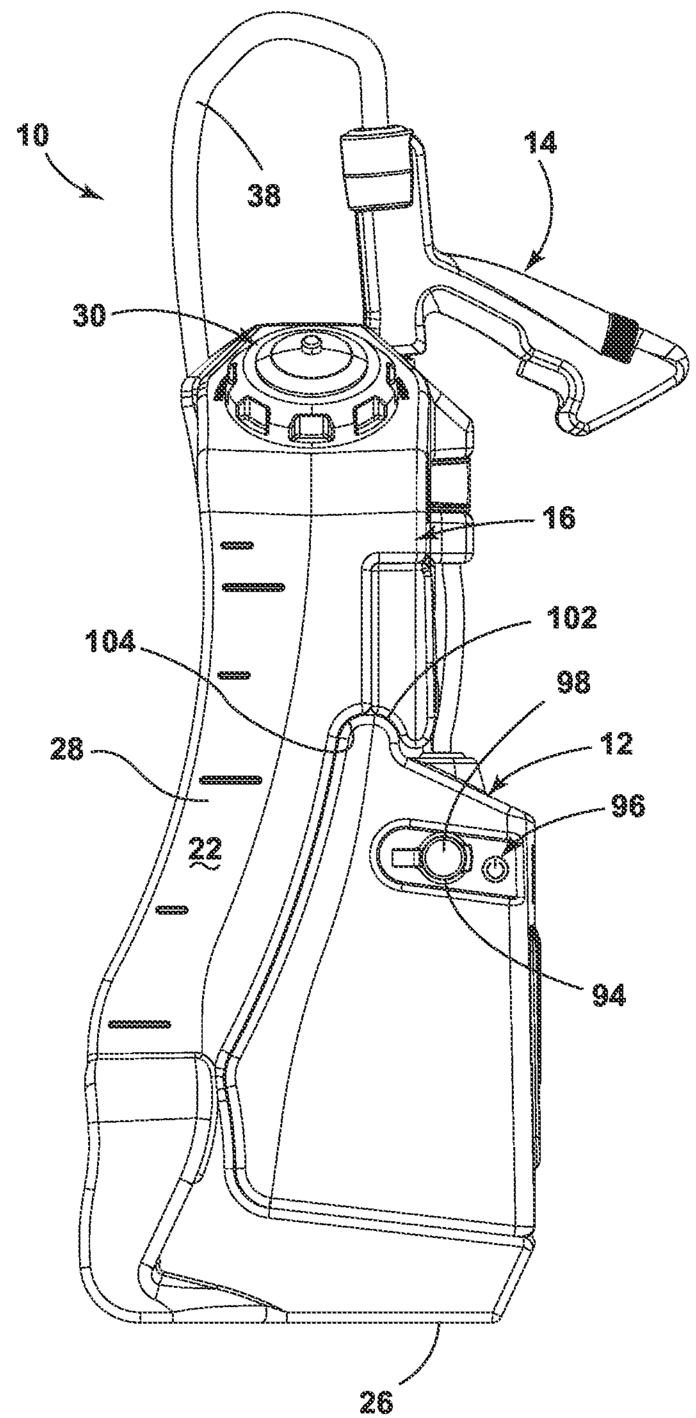
FIG. 4 is a left side view of the pressurized sprayer of FIG. 1.
Figure 5:
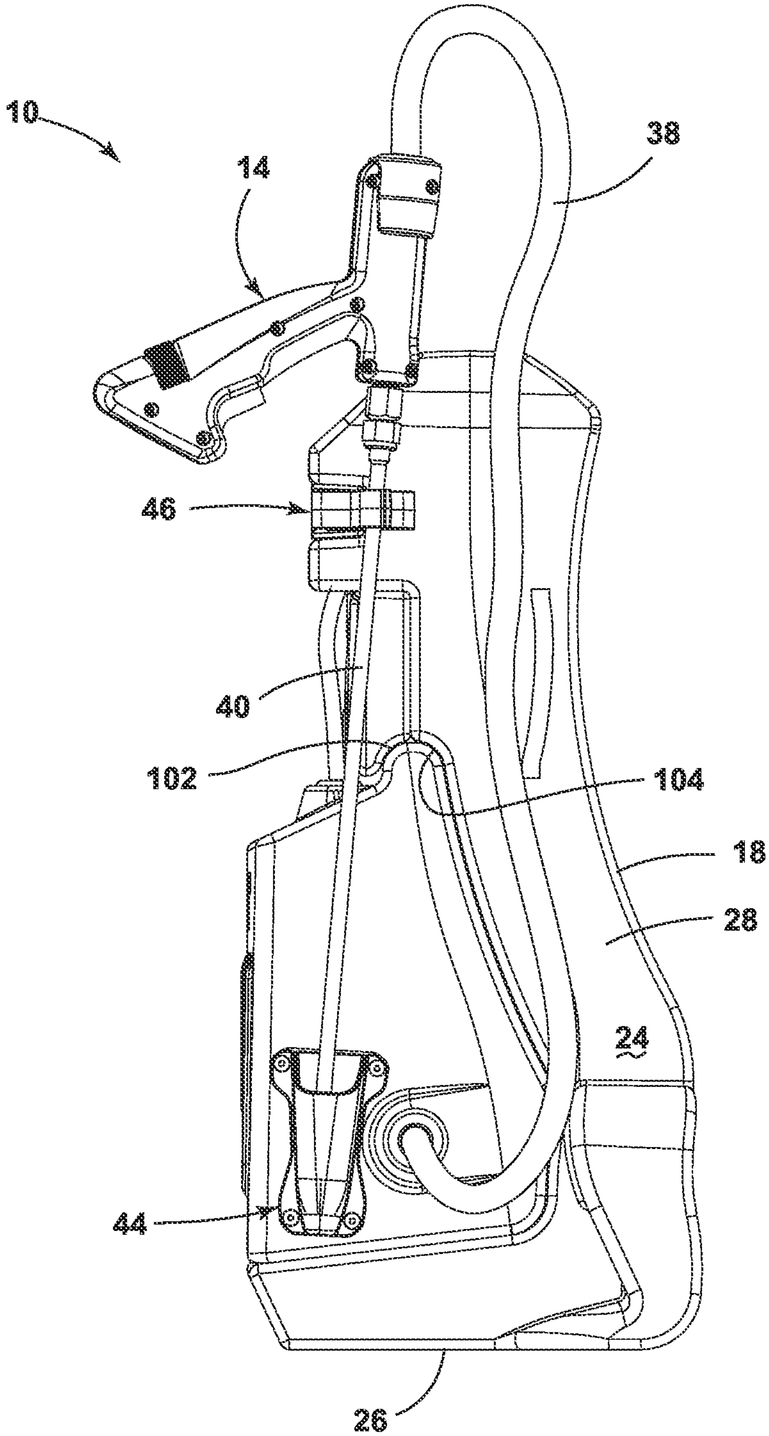
FIG. 5 is a right side view of the pressurized sprayer of FIG. 1.

Referring first to FIGS. 1-5, the pressurized sprayer 10 includes a support frame 16. The support frame 16 is shaped to be worn as a backpack and includes a front-facing portion 18, a rear-facing portion 20, a left-side portion 22, a right-side portion 24, and a bottom portion 26. The support frame 16 defines an internal reservoir 28 in which fluid can be received via a removable fill cap 30. The support frame 16 also includes a handle 32 on an upper portion thereof. Though not shown, the support frame 16 can also include shoulder straps and a waist belt. As shown in FIG. 3, the front-facing portion 18 of the support frame 16 can include multiple fluid level indicators 34. The support frame 16 can comprise a translucent or partially translucent plastic, thereby enabling use of the fluid level indicators 34. In other embodiments the support frame 16 is made of an opaque material, in which case other fluid level indicators (e.g., float-type fluid level indicators) can be used.

The modular power center 12 is received within a receptacle opening 100 in the support frame 16 and is fluidly coupled to a spray wand 36 via a discharge hose 38. The spray wand 36 includes a trigger grip assembly 14, a spray tube 40, and a spray nozzle 42. When the spray wand 36 is stowed as shown in FIGS. 1-5, the spray nozzle 42 is received within a wand cup 44 and the spray tube 40 is secured to the support frame 16 via a wand clip 46.

Figure 6:
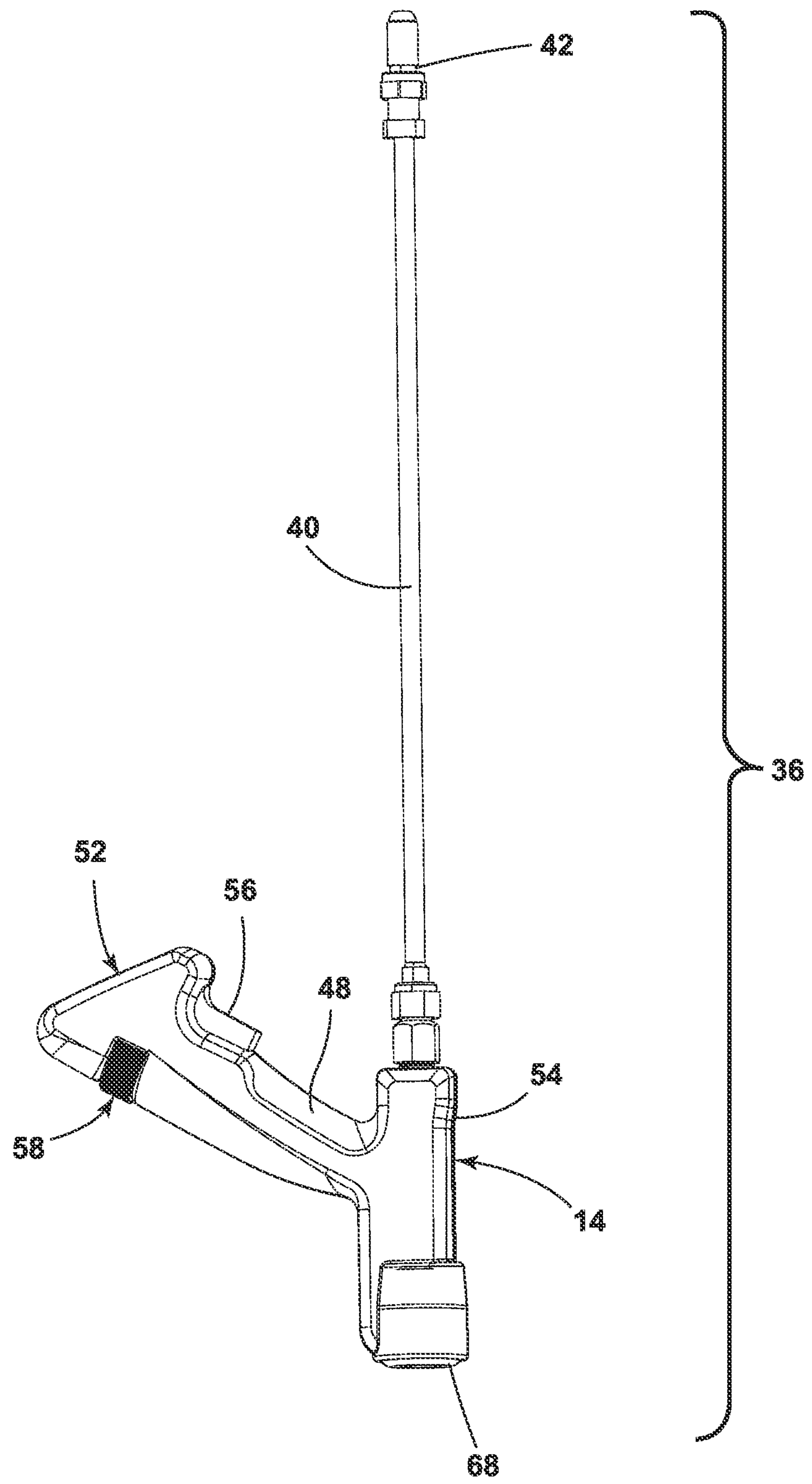
FIG. 6 illustrates a spray wand according to one embodiment.
Figure 7:
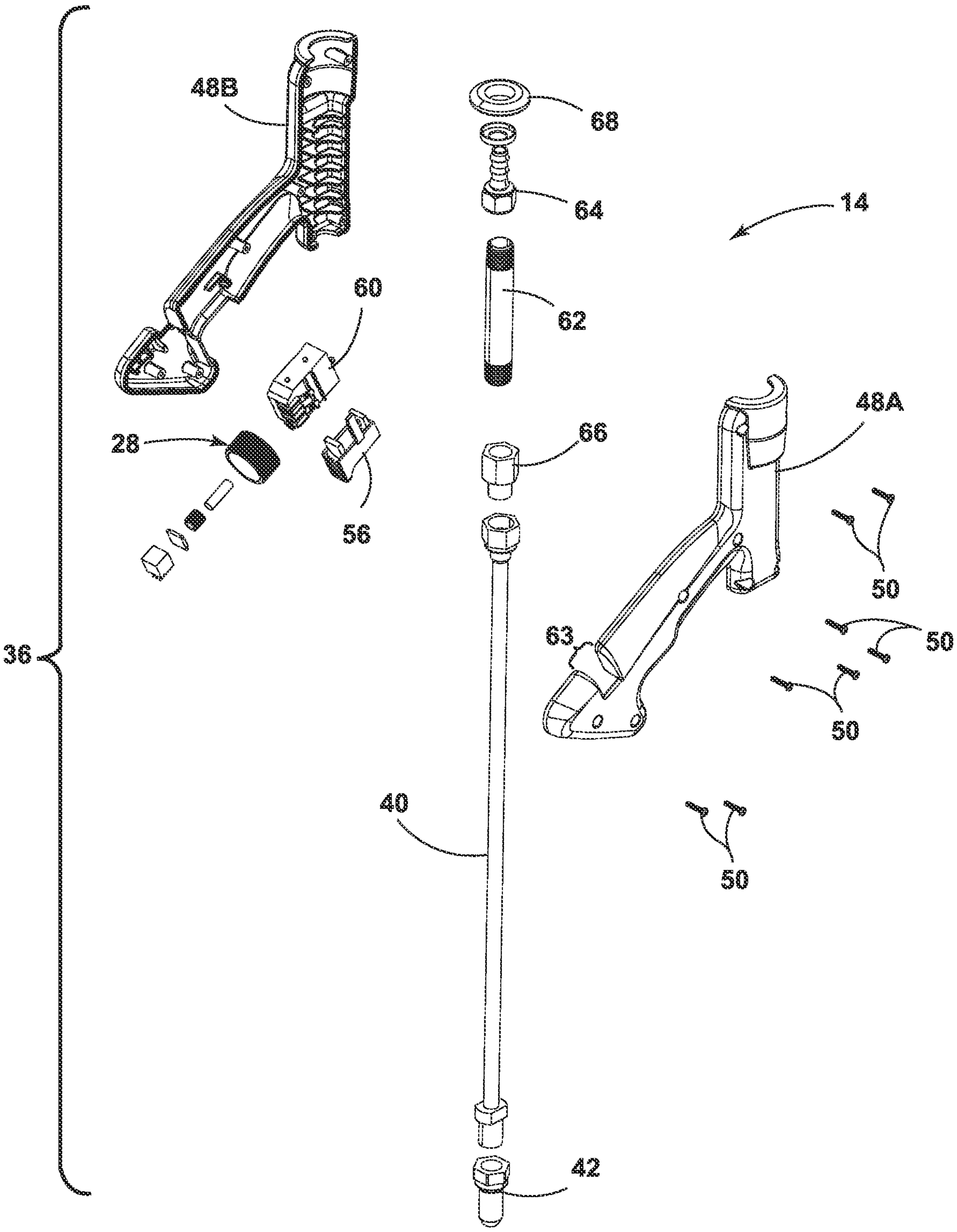
FIG. 7 is an exploded view of the spray wand of FIG. 6.
Figure 8:
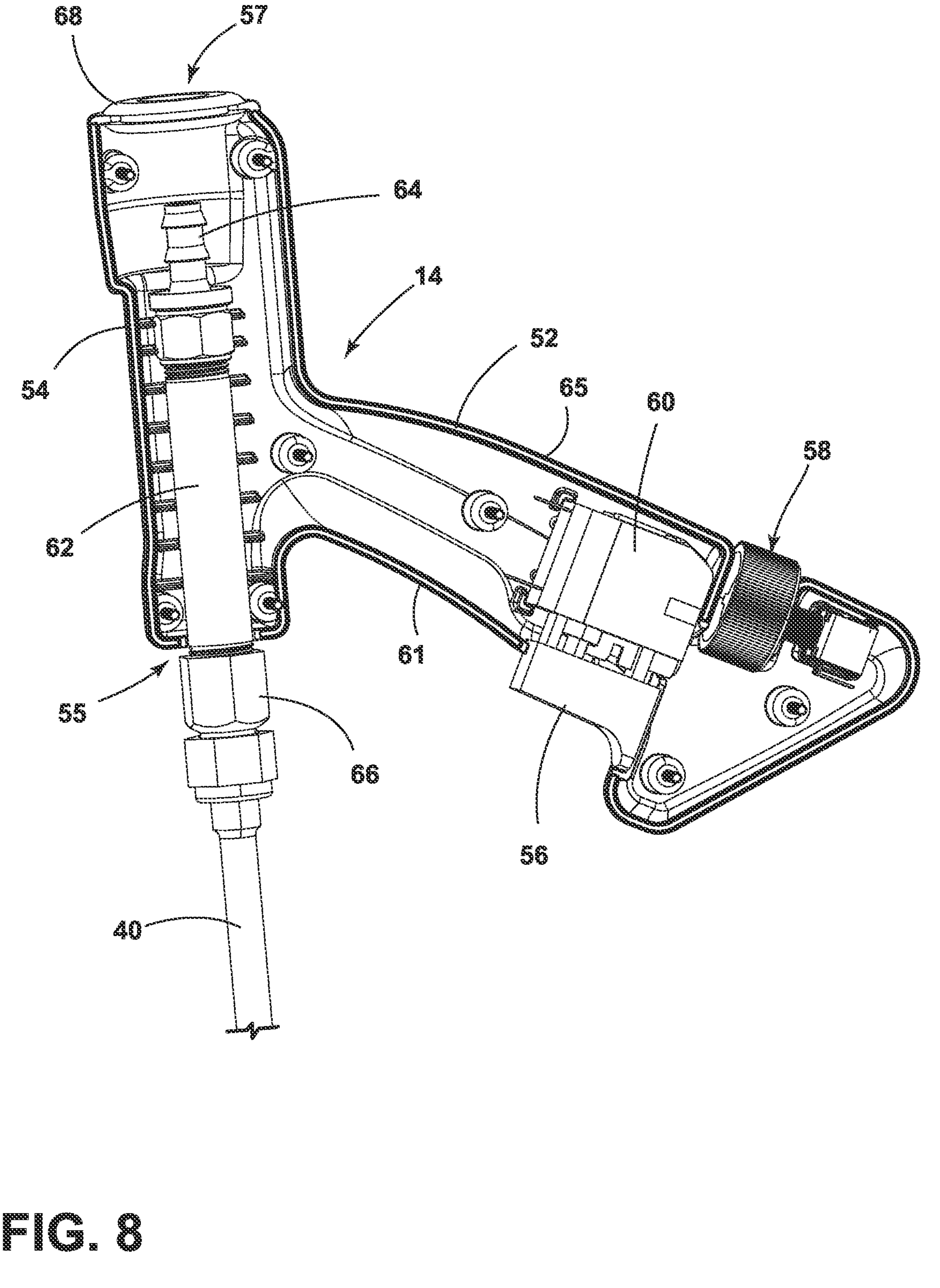
FIG. 8 is a side view of the interior of the spray wand of FIG. 6.

The spray wand 36 is more specifically shown in FIGS. 6-8. As noted above, the spray wand 36 includes a trigger grip assembly 14, a spray tube 40, and a spray nozzle 42. The trigger grip assembly 14 includes a two-piece outer housing 48 defining an inverted pistol grip construction. The two-piece outer housing 48 includes mirror-image halves 48A, 48B, optionally being formed from metal, for example aluminum or copper, or plastic, for example high-density polyethylene, cross-linked polyethylene, nylon, or polypropylene. The two halves 48A, 48B can be glued together or secured together via screws 50 as shown in FIG. 7.

The trigger grip assembly 14 also includes a handle 52 and a cylindrical base 54. The handle 52 is angled forward relative to the cylindrical base 54 and includes a trigger 56 on a leading portion thereof. That is, the base 54 defines a lengthwise axis that extends between a front opening and a rear opening, the handle 52 being angled forward relative to this lengthwise axis. The trigger 56 is an electronic ON/OFF index finger switch that is used to start and stop the discharge of pressurized fluid from the spray nozzle 42. The handle 52 also includes a potentiometer 58 located above the trigger 56 on a trailing portion of the handle 52. The potentiometer 58 comprises a knurled knob that rotates by thumb in either direction to control flow-rate and pressure. Each of the trigger 56 and the potentiometer 58 provide an electrical output via an internal sensor module 60, which is coupled to an on-board controller via one or more electrical connectors. The heavier elements of the trigger grip assembly 14 remain below the operator's forearm and hand, greatly enhancing the ergonomics of the spray wand 36. This configuration enhances the ergonomic feel of the trigger grip assembly 14 by maintaining a natural upright trigger position.

As shown in FIGS. 7-8, the cylindrical base 54 of the trigger grip assembly 14 includes an internal barrel 62 that is externally threaded on opposing ends. The discharge hose 38 fluidly couples the internal reservoir 28 to the barrel 62 via a first fitting 64. The first fitting 64 comprises a barbed connector that is recessed within the trigger grip assembly 14 for attachment to the discharge hose 38. The discharge hose 38 can comprise a resiliently flexible material such as a rubber material. Though not shown, an electrical connection extends between the trigger grip assembly 14 and the modular power center 12, optionally via an electrical connector that is helically wound about the discharge hose 38. The spray tube 40 is threaded to a second fitting 66 opposite of the first fitting 64. The second fitting 66 is internally threaded for attachment to the barrel 62. An end cap 68 is attached to the base of the cylindrical base 54. A valve can be disposed inside the cylindrical base 54 and can be reciprocated by the trigger 56.

More specifically, the trigger grip assembly housing 48 includes a first side portion 48A and a second side portion 48B, the first side portion 48A and the second side portion 48B being peripherally joined to each other to define a handle 52 and a base 54. As used herein, "peripherally joined" means a portion of the peripheral edge of the first side portion 48A engages a portion of the peripheral edge of the second side portion 48B. The base 54 defines a lengthwise axis that extends between a front opening 55 and a rear opening 57, and the handle 52 is angled forward relative to the lengthwise axis of the base 54 at an angle of between 40 and 80 degrees. The push-button trigger 56 protrudes from the forward-facing surface 61 of the handle 52, and the thumbwheel potentiometer 58 is disposed in a gap 63 in the rearward facing surface 65 of the handle 52. The first fitting 64 is recessed within the rear opening 57 in the housing 48, and the second fitting 66 is adjacent to the front opening 55 in the housing 48.

Figure 9:
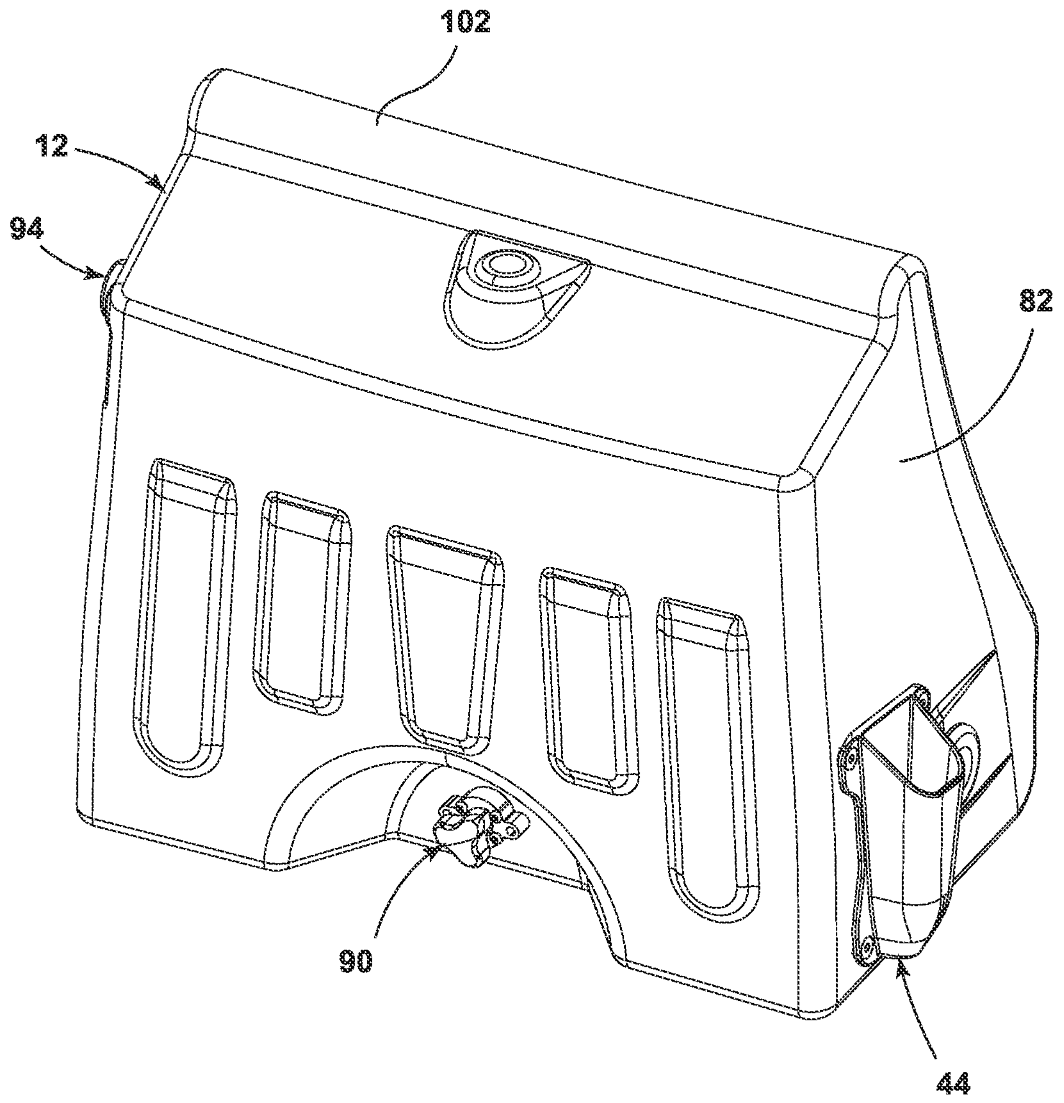
FIG. 9 illustrates a modular power center according to one embodiment.
Figure 10:
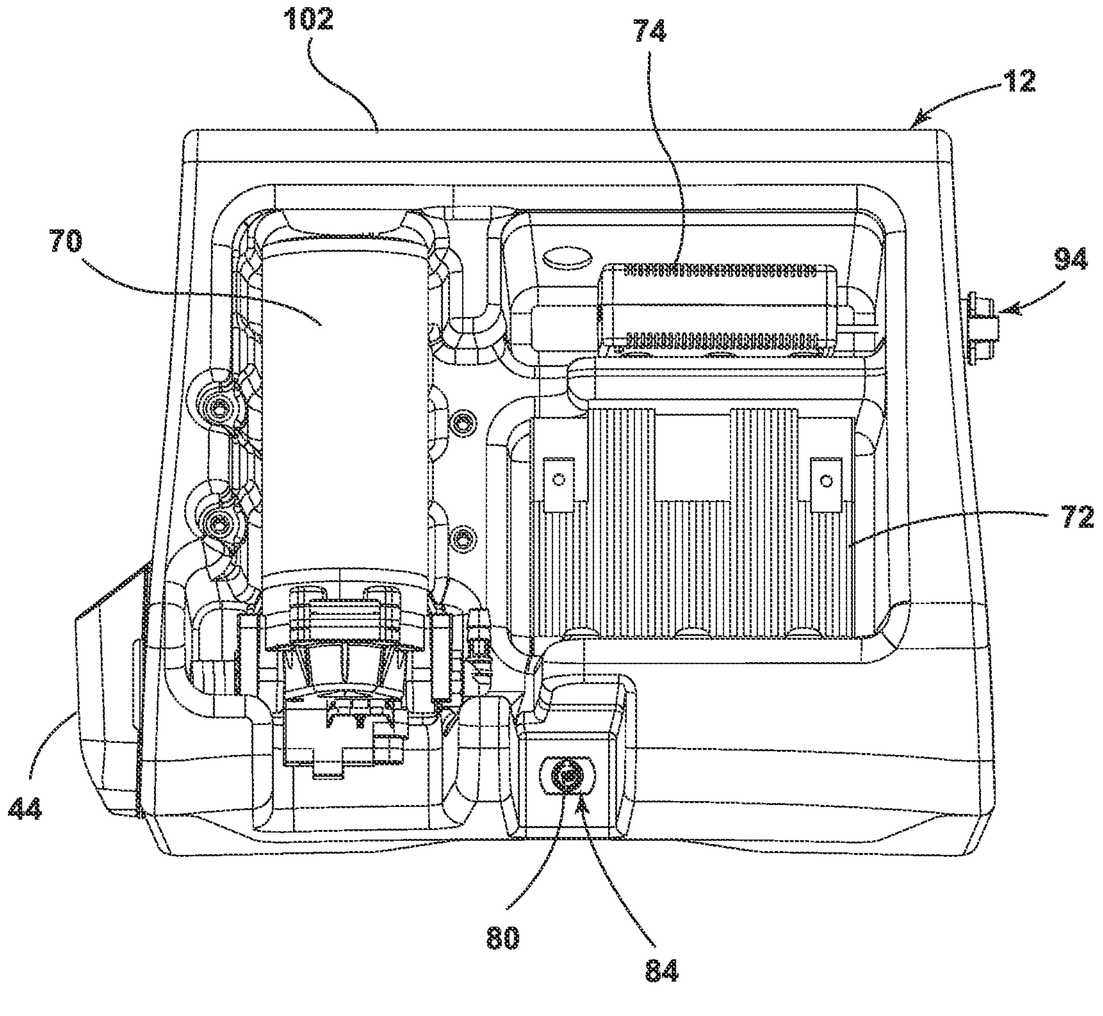
FIG. 10 is an interior view of the modular power center of FIG. 9.
Figure 11:
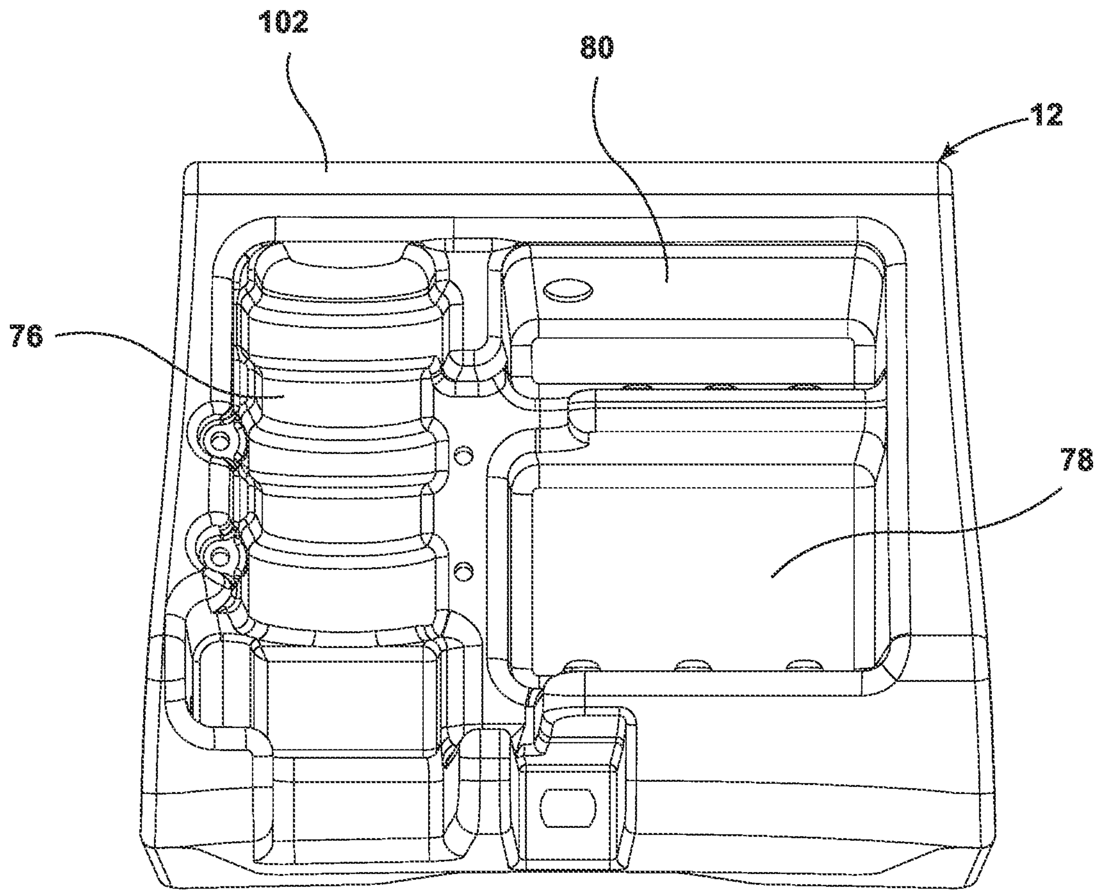
FIG. 11 is an interior view of the modular power center housing of FIG. 9.

Referring now to FIGS. 9-11, the modular power center 12 includes a pump 70, a rechargeable battery 72, and a controller 74. The pump 70 is housed within a first compartment 76, the rechargeable battery 72 is housed within a second compartment 78, and the controller 74 is housed within a third compartment 80. The pump 70 is operable to move the contents of the internal reservoir 28 under pressure to the spray wand 36. The pump 70 is a diaphragm pump in the present embodiment, but in other embodiments other pumps can be used, including for example a centrifugal pump or a positive displacement pump. The rechargeable battery 72 includes a single lithium ion battery, however in other embodiments other batteries can be used. The controller 74 provides a fully variable pulse-width-modulated electrical output for controlling operation of the pump 70, which allows the user to maintain full control of flow rate and pressure via the thumb-operated potentiometer 58. The controller 74 thereby maximizes battery life due to the efficient delivery of energy to the pump 70. While a single rechargeable battery will suffice to power the pressurized sprayer 10, other embodiments can include multiple batteries and/or solar panels to extend pump run times.

The modular power center 12 also includes a housing 82 that is shaped for quick removal from the support frame 16 and includes a magnetic latch 84 and a quick-release hose connector 92. The magnetic latch 84 includes a magnetic surface 88 for engaging a ferromagnetic back plate 89. In other embodiments, the latch 84 is ferromagnetic and the back plate 89 is magnetic. In still other embodiments, both the latch 84 and the back plate 89 are magnetic. The magnetic latch 84 can be rotated in a locking direction or unlocking direction via a rotatable knob 90. The quick-release hose connector 92 (visible in FIGS. 1 and 2) can be coupled to the support frame 16, and in particular the internal reservoir 28. The magnetic latch 84 and the quick-release hose connector 92 provide simplicity in the removal and attachment of the modular power center 12 to a large array of accessories.

The modular power center 12 also includes a waterproof charging port 94 (visible in FIG. 4) for charging the internal rechargeable battery 72. The charging port 94 includes a removable cover 98, for example a rubber cover, to seal the charging port 94 when not in use. The modular power center 12 can be changed out quickly for use with other support frames 16 having other fluid contents. This modularity allows the end-user to adapt to ever-changing demands by way of a seamless quick removal method of a magnetic latch 84 and a quick-release hose 92. This modularity allows for many other applications, including applications requiring the portable redistribution of fluids powerfully and efficiently.

Figure 12:
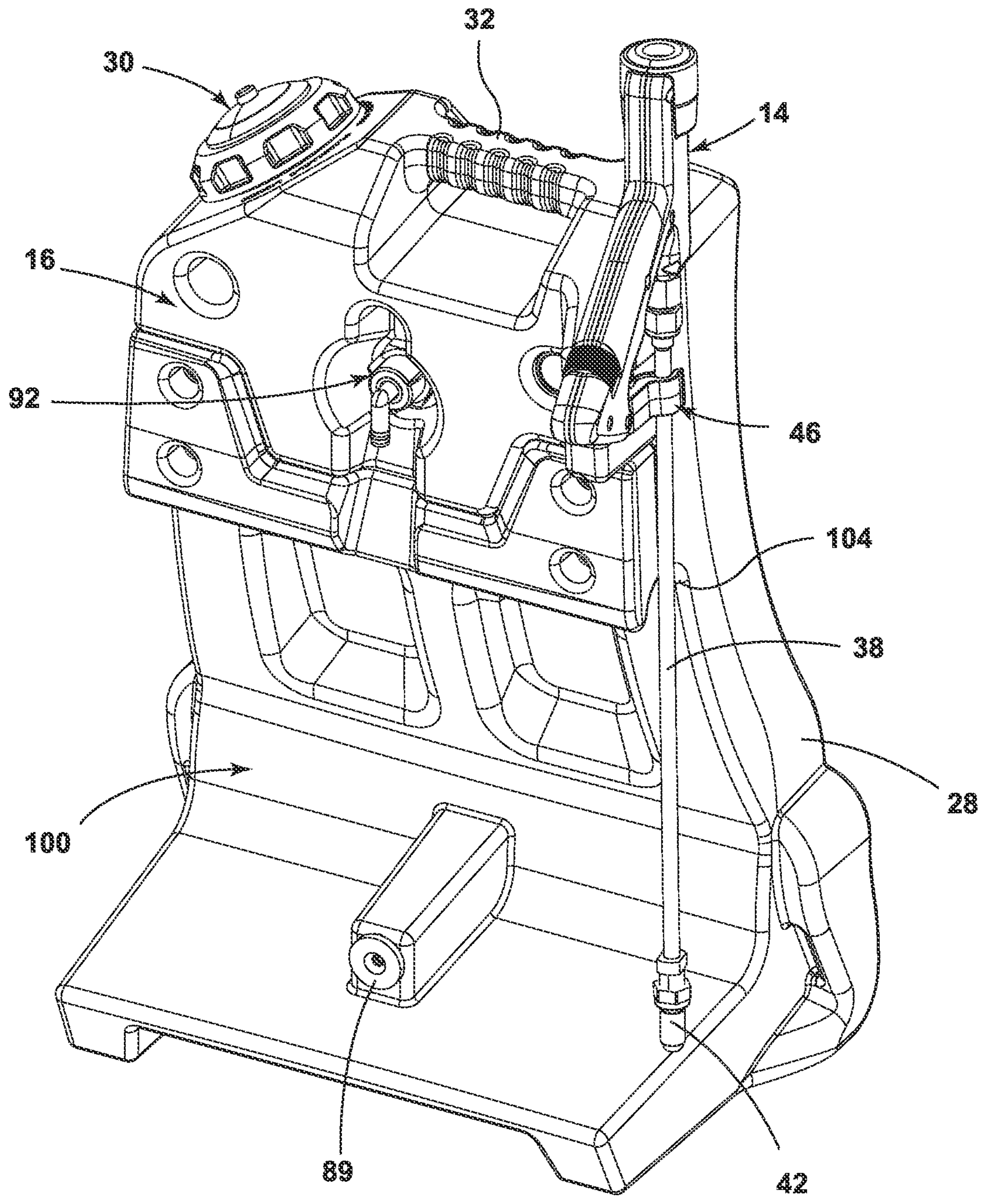
FIG. 12 is a perspective view of the pressurized sprayer of FIG. 1 without the modular power center of FIG. 9.
Figure 13:
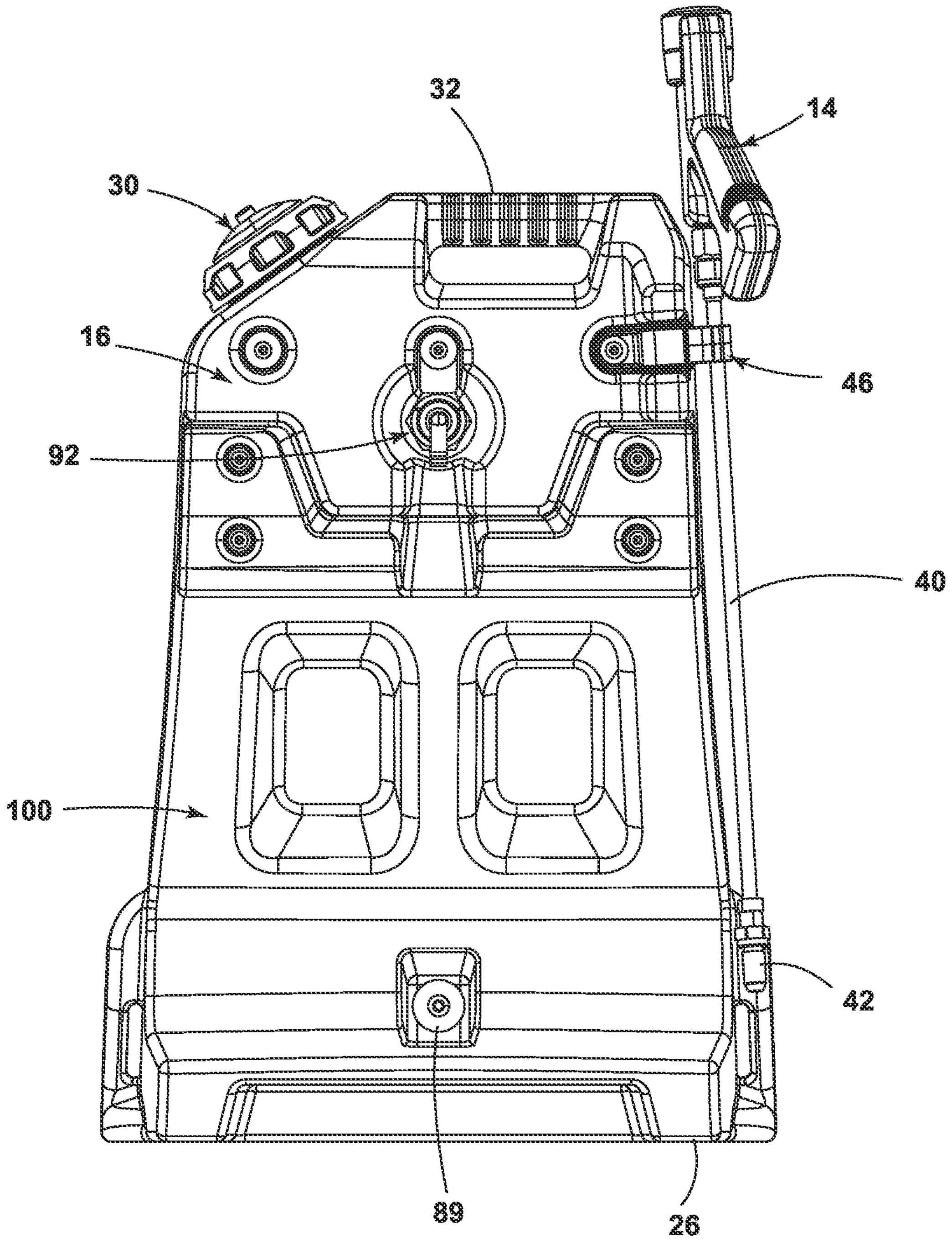
FIG. 13 is a plan view of the pressurized sprayer of FIG. 1 without the modular power center of FIG. 9.

The modular power center 12 also includes a waterproof push-button LED 96 (visible in FIG. 4) as a power ON/OFF switch for the pressurized sprayer 10. The LED 96 is retina-friendly and is easily distinguishable in bright sunlight to enable the operator to know the power status of the modular power center 12. As shown in FIG. 12-13, the rear-facing portion 20 of the support frame 16 includes a receptacle 100 for the modular power center 12. In operation, the operator can seat the modular power center 12 in the receptacle 100 by guiding the rounded upper edge 102 of the modular power center 12 into a corresponding groove 104 in the support frame 16 and pushing forward on the modular power center 12. The operator then engages the magnetic latch 84 by rotating the knob 90 and connects the quick-release hose 92 to the support frame 16. The operator can rotate the spray nozzle 42 to select a desired spray pattern, for example a narrow stream, a wide fan, or an atomized mist. The operator can control the flow-rate of pressurized fluid using the thumbwheel potentiometer 58, and the user can start and stop the flow of pressurized fluid using the electronic trigger switch 56. The readily accessible nature of these controls allows the operator to meet the needs of a variety of applications, with all electronic controls at a natural forefinger and thumb rest point. The heavier elements of the trigger assembly, specifically the hose 38 and the pressurized fluid, remain below the forearm and the hand of the operator. This configuration enhances the ergonomic feel of the trigger grip assembly 14 by maintaining a natural upright trigger position. In addition, the thumbwheel potentiometer 58 allows finite electrical control of pressure and flow rates.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A trigger grip assembly comprising:

a housing including a first side portion and a second side portion, the first side portion and the second side portion being peripherally joined to each other to define a base and a handle, the base defining a lengthwise axis that extends between a front opening and a rear opening, the handle being angled forward relative to the lengthwise axis of the base;

a push-button trigger protruding from a forward facing surface of the handle;

a thumbwheel potentiometer disposed in a gap in a rearward facing surface of the handle;

a first fitting recessed within the rear opening of the housing; and a second fitting adjacent to the front opening of the housing.

2. The trigger grip assembly of claim 1, wherein the first fitting is a barbed fitting and wherein the second fitting is a threaded fitting.

3. The trigger grip assembly of claim 1, further comprising:

a spray tube coupled to the first fitting; and a spray nozzle coupled to the spray tube.

4. The trigger grip assembly of claim 3, wherein the thumbwheel potentiometer is rotatable for controlling a flow-rate of fluid being discharged from the spray nozzle.

5. The trigger grip assembly of claim 3, wherein actuating the trigger causes the discharge of fluid from the spray nozzle.

6. The trigger grip assembly of claim 1, wherein the first side portion and the second side portion comprise opposing first and second halves of the housing.

7. The trigger grip assembly of claim 6, further including a plurality of fasteners joining the first side portion of the housing to the second side portion of the housing.

8. The trigger grip assembly of claim 6, wherein the first side portion of the housing is adhesively joined to the second side portion of the housing.

9. The trigger grip assembly of claim 1, wherein the handle is rigidly joined to the base and is angled forward relative to the base at an angle of between 40 degrees and 80 degrees.

10. The trigger grip assembly of claim 1, wherein the base contains a barrel that is externally threaded on opposing ends thereof for attachment to the first and second fittings.

* * * * *